United States Patent
Price et al.

(10) Patent No.: US 7,328,805 B2
(45) Date of Patent: Feb. 12, 2008

(54) METHOD AND SYSTEM FOR BENEFICIATING GASIFICATION SLAG

(75) Inventors: Charles E. Price, Madisonville, KY (US); William Lee Barnwell, Beaver Dam, KY (US); John G. Groppo, Jr., Wilmore, KY (US)

(73) Assignee: Charah Enviromental, Inc., Madisonville, KY (US)

( * ) Notice: Subject to any disclaimer, the term of this patent is extended or adjusted under 35 U.S.C. 154(b) by 232 days.

(21) Appl. No.: 10/657,730

(22) Filed: Sep. 8, 2003

(65) Prior Publication Data

US 2005/0051500 A1 Mar. 10, 2005

(51) Int. Cl.
*B66B 9/00* (2006.01)
*B66B 7/00* (2006.01)
*B02B 1/00* (2006.01)

(52) U.S. Cl. .............................. 209/2; 209/17; 209/268; 241/21; 241/31

(58) Field of Classification Search .................. 209/17, 209/2; 241/21, 31
See application file for complete search history.

(56) References Cited

U.S. PATENT DOCUMENTS

| | | | | |
|---|---|---|---|---|
| 3,840,345 A | * | 10/1974 | Andre | ........................ 422/143 |
| 3,851,827 A | * | 12/1974 | Carignani et al. | ............ 241/65 |
| 3,957,459 A | * | 5/1976 | Mitchell et al. | .......... 48/197 R |
| 4,392,940 A | * | 7/1983 | Tao | ............................ 208/414 |
| 4,508,542 A | * | 4/1985 | Langhoff et al. | .............. 48/77 |
| 4,927,956 A | * | 5/1990 | Vicari et al. | ................. 560/130 |
| 5,045,087 A | * | 9/1991 | Keller | .......................... 44/280 |
| 5,427,607 A | * | 6/1995 | Cristovici et al. | ............ 241/20 |
| 5,992,641 A | * | 11/1999 | Caldwell, Jr. | ............... 209/273 |
| 6,274,045 B1 | * | 8/2001 | Kreisler | ...................... 210/710 |
| 2001/0033823 A1 | * | 10/2001 | Kuniyoshi et al. | .......... 423/520 |

* cited by examiner

*Primary Examiner*—Patrick Mackey
*Assistant Examiner*—Terrell Matthews
(74) *Attorney, Agent, or Firm*—Moore & Van Allen PLLC

(57) ABSTRACT

The present invention provides a method of beneficiating slag, including mixing the slag with water to form a slurry. The slurry is screened through a first screen to remove a first portion of material and then screened through a second screen to remove a second portion of material. In one embodiment, the second portion of material has a carbon content less than about 5% and, more preferably, a carbon content less than about 1%.

79 Claims, 7 Drawing Sheets

| Size Fraction (inches or mesh) | Weight % | LOI (%) |
|---|---|---|
| +1/2 | 0.20 | 45.00 |
| -1/2+1/4 | 0.30 | 22.55 |
| -1/4+4 | 0.36 | 9.63 |
| -4+6 | 2.64 | 2.09 |
| -6+20 | 29.11 | 1.20 |
| -20+30 | 4.63 | 60.11 |
| -30+40 | 6.91 | 65.17 |
| -40+50 | 9.42 | 68.74 |
| -50+60 | 4.86 | 62.47 |
| -60+80 | 6.68 | 56.25 |
| -80+100 | 4.01 | 32.28 |
| -100+200 | 11.53 | 31.42 |
| -200+325 | 6.02 | 27.74 |
| -325 | 13.32 | 30.55 |
| Total | 100.00 | 31.81 |

Figure 4

| | Size Fraction (mesh) | Weight % | LOI (%) | LOI Distribution (%) |
|---|---|---|---|---|
| Second Portion | -4+20 | 32.6 | 1.83 | 1.9 |
| Third Portion | -20+80 | 32.5 | 63.25 | 64.6 |
| Fourth Portion | -80 | 34.9 | 30.55 | 33.5 |
| | Total | 100 | 31.81 | 100.0 |

Figure 5

| Size Fraction (mesh) | Size Fraction (microns) | Weight % | LOI % |
|---|---|---|---|
| 12 | +1410 | 63.4 | 0.15 |
| -12+20 | -1410+841 | 33.3 | 0.57 |
| -20 | -841 | 3.3 | 0.74 |
| Total | | 100 | 0.31 |

Figure 6

| Size Fraction (mesh) | Size Fraction (microns) | Weight % | LOI % |
|---|---|---|---|
| +20 | +841 | 0.7 | 4.6 |
| -20+80 | -841+177 | 84.2 | 68.4 |
| -80 | -177 | 15.1 | 30.5 |
| Total | | 100.0 | 63.22 |

Figure 7

| Size Fraction (mesh) | Size Fraction (microns) | Weight % | LOI % |
|---|---|---|---|
| +100 | +150 | 11.5 | 32.3 |
| -100+200 | -150+74 | 33.0 | 31.4 |
| -200+325 | -74+44 | 17.3 | 27.7 |
| -325 | -44 | 38.2 | 30.6 |
| Total | | 100.0 | 30.5 |

Figure 8

METHOD AND SYSTEM FOR BENEFICIATING GASIFICATION SLAG

BACKGROUND OF THE INVENTION

1. Field of the Invention

The present invention relates generally to the gasification of coal and similar carbonaceous solids and, more particularly, to methods and apparatus for beneficiating the resulting gasification slag.

2. Description of Related Art

Coal and other carbonaceous solids are commonly used as fuel in electricity generating processes. For example, in a fluidized bed process, also referred to as gasification, carbonaceous solids (i.e., coal, char, etc.) are thermally converted into a combustible gaseous product via partial oxidation in a reactive gaseous atmosphere. The product of gasification is a reactive gas composed of carbon monoxide and hydrogen. This gas can be used as a fuel directly or it can be converted to other products such as synthetic oil. The inorganic portion of the coal forms a vitreous slag by-product.

Referring to FIG. 1, there is illustrated a process flow diagram for one embodiment of a gasification facility, such as the Polk Station operated by Tampa Electric Company in Mulberry, Fla. Feed coal is ground and mixed with water at a slurry plant 10 to produce a slurry containing approximately 60-70% solids. The coal slurry is fed into the top of an entrained-flow gasifier 12 along with oxygen from an oxygen plant 14 to produce a high temperature, high pressure, medium Btu synthesis gas of approximately 267 Btu/scf. The synthesis gas is cooled in one or more heat exchangers 16 to generate high-pressure steam that can be used to power a steam turbine 20 to generate electricity. The cooled synthesis gas is cleaned in a scrubber 22a and particulate filter 22b to remove contaminants such as sulfur and ash and then combusted along with nitrogen ($N_2$) in a gas turbine 24 to generate electricity.

Coal gasification differs significantly from combustion, which is a more widely applied coal utilization technology. During combustion, coal is burned to produce heat and fully oxidized combustion gases, primarily carbon dioxide and water vapor. The inorganic portion of the coal forms "fly ash" a very fine dry powdery material that is typically collected dry in cyclones, electrostatic precipitators and baghouses. A much smaller amount of ash also is collected from the combustor as coarser "bottom ash." Bottom ash particles are irregularly-shaped, frequently porous and low in carbon content.

Not surprisingly, the nature of the by-products generated by gasification and combustion is as different as the technologies are. Slag, which is the by-product of gasification, comprises molten or partially fused particles that come into contact with the furnace wall, become chilled, and solidify. Typically, slag is removed from the gasifier as a slurry. Slag is generally much denser than either fly ash or bottom ash. The coarse component of the slag is essentially a coarse vitreous, high density, abrasive solid that is low in carbon content. The physical shape of the coarse slag particles ranges from rod or needle-like structures to irregular-shaped jagged pieces. The finer slag is comprised of char or unburned carbon particles containing varying amounts of siliceous ash. The carbonaceous phase of the ash is irregularly shaped particles with a highly developed pore structure.

Slag is generally not usable when it comprises a mixture of coarse, vitreous material and fine, porous carbon material, such as when the slag is removed from the gasifier. Accordingly, there is a need for methods and apparatus to beneficiate the slag by-product into its coarser and finer constituents. The method and apparatus should enable not only the economical separation of the slag by-products into useful components, but the separation of the by-products into useful components with acceptable quality and sizing for specific end use markets.

SUMMARY OF THE INVENTION

The present invention provides apparatus and methods for beneficiating slag economically. According to one embodiment, the method includes mixing the slag with water to form a slurry. The mixing step can include agitating the slag to break up any agglomerated particles. The slurry is screened through a first screen to remove a first portion of material and then screened through a second screen to remove a second portion of material. A fluid can be sprayed onto one or both of the first and second screens concurrently with the corresponding first and second screening steps to facilitate the passage of material through the screens. The first and/or second screens can also be vibrated concurrently with the corresponding first and second screening steps to facilitate the passage of material through the screens.

In one embodiment, the second portion of material has a carbon content less than about 5% and, more preferably, a carbon content less than about 1%. Although the size of the particles in the first and second portions can vary, in one embodiment the first portion of material has a particle size exceeding approximately 0.5 inches. In another embodiment, the second portion of material has a particle size of between approximately 0.5 inches and approximately 840 µm.

According to another embodiment of the present invention, the method includes screening the slurry subsequent to the second screening step through a centrifuge to remove a third portion of material. The third portion of material preferably has a higher carbon content than the second portion of material. The size of the particles in the third portion can vary. In one embodiment, the third portion of material has a particle size between approximately 840 µm and approximately 45 µm. The third portion of material preferably has a higher carbon content than the second portion of material. The third portion of material can be used as a fuel product or adsorbent carbon. In still another embodiment, the slurry is thickened subsequent to the third screening step using an anionic flocculent such as polyacrylamide or acrylamide copolymers to thereby remove a fourth portion of material from the slurry. If desired, a pH modifier such as sodium hydroxide or ammonium hydroxide can be used to clarify the water. The fourth portion of material can thereafter be processed using a belt filtering press to dewater the fourth portion of material. The processed fourth portion of material can be used as a fuel product or adsorbent carbon.

According to yet another embodiment of the present invention, the method includes screening the slurry subsequent to the second screening step using a hydrocyclone to remove a third portion of material. The third portion of material preferably has a higher carbon content than the second portion of material. The size of the particles in the third portion can vary. In one embodiment, the third portion of material has a particle size of between approximately 840 µm to approximately 75 µm. The third portion of material or "underflow" from the hydrocyclone preferably is dewatered using a centrifuge. The third portion of material can be used as an adsorbent carbon or a fuel product. Subsequent to the third screening step, the slurry can be further processed by thickening the slurry using an anionic flocculent such as polyacrylamide or acrylamide copolymers to thereby remove a fourth portion of material from the slurry. If desired, a pH modifier such as sodium hydroxide or ammonium hydroxide can be used to clarify the water. Thereafter, the fourth portion of material can be processed using a belt filtering press to dewater the fourth portion of material. In one embodiment, the fourth portion of material has a particle size of less than approximately 75 μm. The fourth portion of material can be used as a fuel product or adsorbent carbon.

The present invention also provides a system for beneficiating a slag slurry into usable portions. According to one embodiment, the system includes a first screen for removing a first portion of material from the slurry. The system also includes a second screen for removing a second portion of material from the slurry. In one embodiment, the second portion of material has a carbon content of less than about 5% and, more preferably, less than about 1%. Although the size of the particles in the first and second portions can vary, in one embodiment the first portion of material has a particle size exceeding approximately 0.5 inches. In another embodiment, the second portion of material has a particle size of between approximately 0.5 inches and approximately 840 μm. In one embodiment, the system includes a blunger for mixing and agitating the slurry. In another embodiment, the system includes at least one sprayer for spraying fluid onto at least one of the first and second screens to facilitate the passage of material through the screens. In still another embodiment, the system includes at least one vibrator for vibrating at least one of the first and second screens to facilitate the passage of material through the screens.

According to another embodiment of the present invention, the system includes a centrifuge for removing a third portion of material from the slurry. The third portion of material preferably has a higher carbon content than the second portion of material. While the size of the particles in the third portion can vary, in one embodiment the third portion of material has a particle size of between approximately 840 μm and approximately 45 μm. The system can further include a thickener for removing a fourth portion of material from the slurry. In one embodiment, the system includes a belt filtering press for dewatering the fourth portion of material.

According to yet another embodiment of the present invention, the system includes a hydrocyclone for removing a third portion of material from the slurry. The third portion of material preferably has a higher carbon content than the second portion of material. While the size of the particles in the third portion can vary, in one embodiment the third portion of material has a particle size of between approximately 840 μm and approximately 75 μm. The system can include a centrifuge for dewatering the third portion of material. The system can further include a thickener for removing a fourth portion of material from the slurry. In one embodiment, the system includes a belt filtering press for dewatering the fourth portion of material.

Accordingly, there has been provided methods and apparatus to beneficiate the slag by-product from gasification economically. The methods and apparatus enable not only the separation of the slag by-products into useful components, but also the separation of the by-products into useful components with acceptable quality and sizing for specific end use markets. The coarse slag by-product, which preferably includes the first and/or second portions of the material, has unique physical and chemical properties and can be used for many applications, including abrasive media (i.e., sand blasting grit), polishing media, roofing granules, cement kiln feed, athletic track surfaces, landscaping, and road surface coatings. In addition, the coarse slag by-product can also be milled and used as a pozzolanic cement additive to improve the properties of concrete. The finer slag by-product, which preferably includes the third and fourth portions of the material, can be utilized as a supplemental pulverized coal combustion fuel and has shown excellent potential as both an adsorbent and as a precursor for activated carbon.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein:

FIG. 4 is a table illustrating the size analysis of a composite feed sample, according to one embodiment of the present invention;

FIG. 5 is a table illustrating a condensed size distribution, once oversize material is removed and selected size fractions are combined, according to one embodiment of the present invention;

FIG. 6 is a table illustrating the size analysis of a second portion of material beneficiated according to one embodiment of the present invention;

FIG. 7 is a table illustrating the size analysis of a third portion of material beneficiated using the system illustrated in FIG. 2;

FIG. 8 is a table illustrating the size analysis of a third portion of material beneficiated using the system illustrated in FIG. 3;

DETAILED DESCRIPTION OF THE INVENTION

The present invention now will be described more fully hereinafter with reference to the accompanying drawings, in which some, but not all embodiments of the invention are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
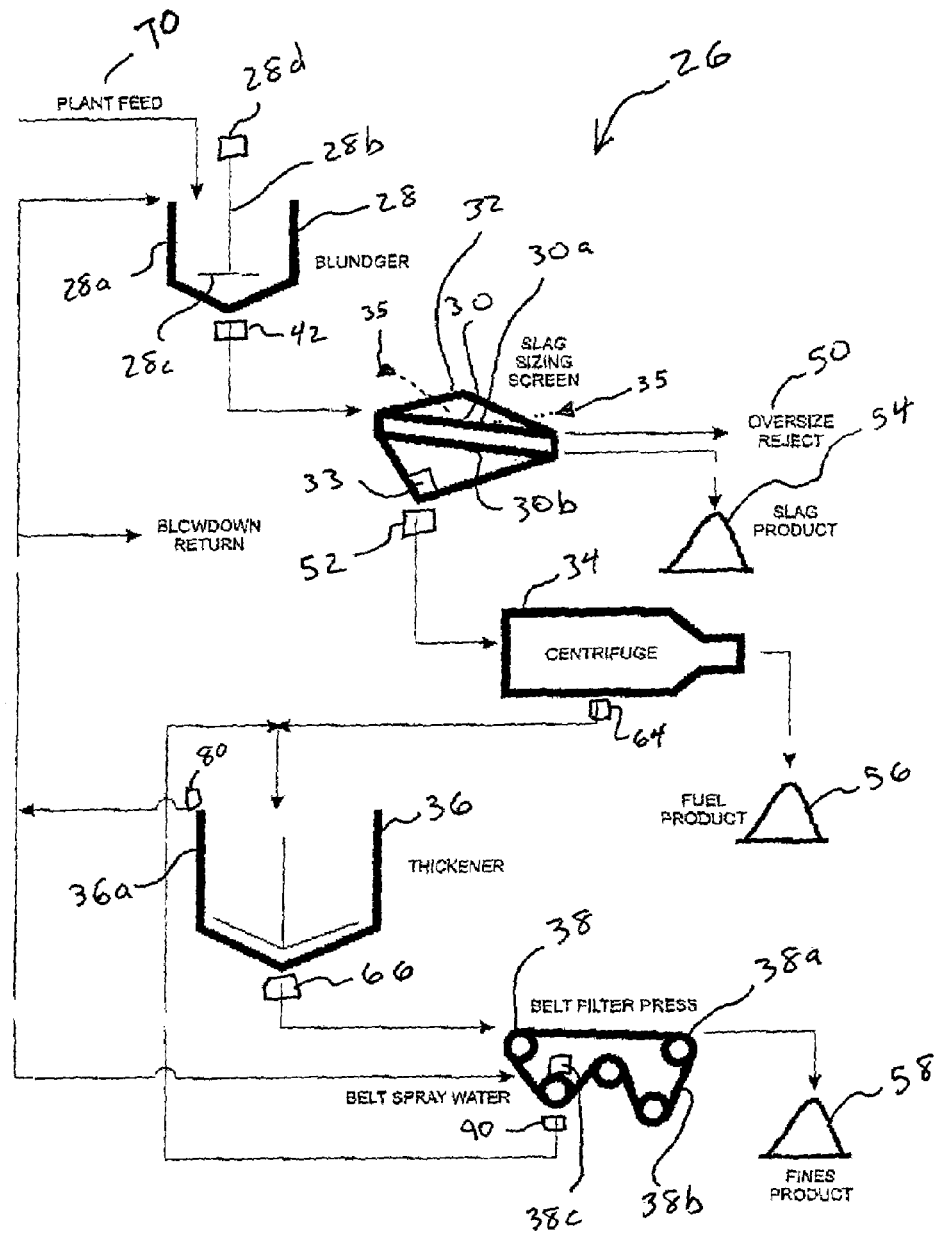
FIG. 2 is a flow diagram illustrating an apparatus for beneficiating slag by-product, according to one embodiment of the present invention.

Referring to FIG. 2, there is illustrated a diagram of a slag beneficiation system or apparatus 26, according to one embodiment of the present invention. According to the illustrated embodiment, the apparatus 26 includes a blunger 28, slag sizing screens 30, a centrifuge 34, a thickener 36 and a belt filter press 38. The blunger 28 comprises a tank or other holding vessel 28a structured to receive water and slag and a mechanical agitator 28b having a paddle, impeller or other mixing tool 28c rotatably attached to a motor 28d for mixing or stirring the water and slag into a slurry. For example, in one embodiment, the blunger 28 comprises an 8 ft. by 8 ft. tank 28a with a 10 hp motor 28d and a four (4) blade mixing tool 28c, such as is the Svedala brand of blunger distributed by Metso Minerals.

The slurry is pumped to the sizing screens 30 from the blunger 28 using pump 42. The slag sizing screens 30 preferably include at least two screens 30a, b, which can be arranged in series with appropriate piping or channeling (not shown) provided to move the slurry between the screens. The number of screens can vary from two to three or more screens depending on the number of portions into which the slag is to be separated. In another embodiment, the sizing screens are mounted together in a screen deck 32 in which the sizing screens are superimposed in descending order of sizing, i.e., the screen with the largest sizing is first and the screen with the smallest sizing is last. For example, as illustrated in FIG. 2, the first screen 30a is superimposed over the second screen 30b and so forth as part of a screen deck 32. The screen deck 32 preferably includes a vibrator 33, such as a motor or other oscillating device, structured to vibrate at least one of the sizing screens 30 and, preferably, each of the screens. In embodiments where the sizing screens are in series (not shown), each screen can have a vibrator 33 attached thereto. The sizing of the screens 30 can vary depending upon the specifications of the portions to be beneficiated from the slag. According to one embodiment, the first screen is a 0.5 inch (12.7 mm) screen 30a and the second screen 30b is a 20 mesh (841 µm) screen. The system preferably includes one or more spray bars or nozzles 35 structured and positioned to direct fluid, such as a liquid or gas, against the screens to ensure that all of the material having a size less than the sizing of the corresponding screen passes through the screen.

The centrifuge 34 comprises a conical drum or bowl that rotates between approximately 2000 to 4000 rpm. The slurry can be pumped to the centrifuge 34 from the sizing screens 30 using pump 52. The slurry is fed into one end and the separated solids are moved up the bowl by a rotating scroll to exit at the other end, as is known in the art. For example, the centrifuge 34 can comprise a 44 inch by 132 inch horizontal screen bowl dryer with a 400 hp motor, as is distributed by Decanter Machine, Inc.

The thickener 36 comprises a tank or other holding vessel 36a structured to receive a slurry of water and slag. For example, the slurry can be pumped to the thickener 36 from the centrifuge 34 using pump 64. The thickener 36 preferably comprises a static thickener using anionic flocculants such as polyacrylamide or acrylamide copolymers, which causes the solids in the slurry to settle from the water at a settling rate of approximately 6 inches to approximately 12 inches per minute. A pH control, such as sodium hydroxide or ammonium hydroxide, can be used to obtain acceptable water clarity. According to one embodiment, the thickener 36 comprises a HF-30F thickener distributed by Phoenix Processing Equipment Co.

The belt filter press 38 comprises a filter medium 38a attached to a belt 38b, both of which are in operable communication with a motor 38c. The filter medium 38a is structured to dewater the slurry and separate the remaining solids therefrom as the motor 38c circulates the belt 38b and filter medium. The sizing and dimensions of the filter medium 38c will depend upon the specifications for the solids to be dewatered. According to one embodiment, the belt filter press 38 comprises a WX-3.0 G belt filter press distributed by Phoenix Processing Equipment Co.

Figure 3:
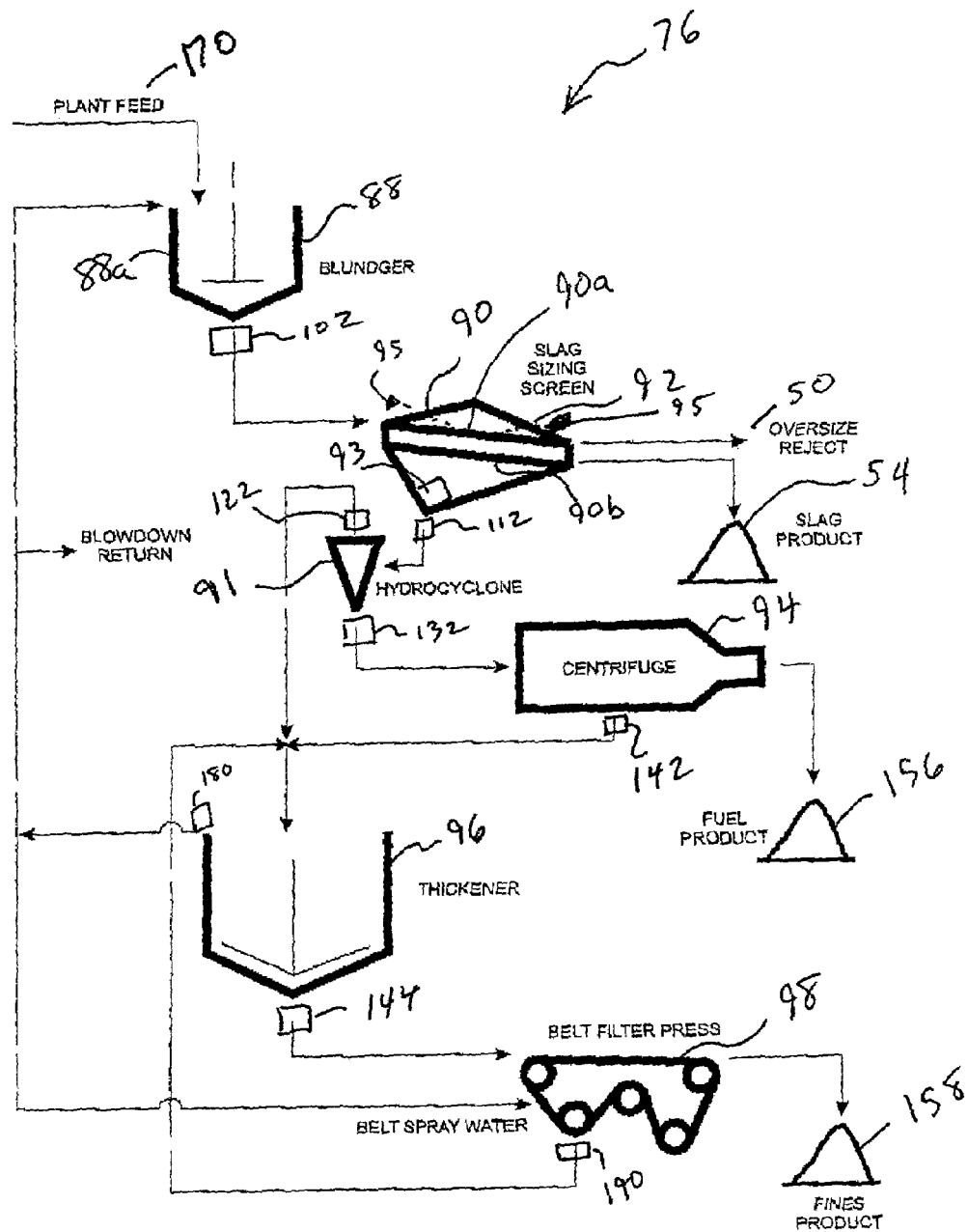
FIG. 3 is a flow diagram illustrating an apparatus for beneficiating slag by-product, according to another embodiment of the present invention.

According to another embodiment of the invention, as illustrated in FIG. 3, the system 76 includes a blunger 88, slag sizing screens 90, a hydrocyclone 91, a centrifuge 94, a thickener 96 and a belt filter press 98. The blunger 88 and slag sizing screens 90 operate as discussed above with the slurry being pumped from the blunger to the sizing screens using pump 102. The hydrocyclone 91 comprises an inverted cone in which the slurry is fed tangentially into the upper part of the cone. For example, the slurry can be pumped to the hydrocyclone 91 from the sizing screens 90 using pump 112. The hydrocyclone 91 rotates due to the pressure and velocity of the slurry entering the cone. As the hydrocyclone 91 spins the separated solids or "underflow" are forced against the wall of the cone and out the apex of the cone. The spinning motion results in the water in the slurry exiting out the top of the cone, which is referred to as the "overflow." According to one embodiment, the hydrocyclone 40 comprises a 15-inch cyclone distributed by Krebs Engineers.

The overflow from the hydrocyclone 91 can be pumped using pump 122 to the thickener 96. The underflow from the hydrocyclone 91 can be pumped using pump 132 to the centrifuge 94. Alternatively, the underflow is fed from the hydrocyclone 91 to the centrifuge 94 via gravity feed. The centrifuge 94 operates to dewater the underflow from the hydrocyclone 91. Any remaining slurry from the centrifuge 94 can then be pumped using pump 142 to the thickener 96 along with the overflow from the hydrocyclone 91. The thickener 96 operates, as discussed above, to settle solids from the slurry. The separated solids from the thickener 96 can be pumped using pump 144 to the belt filter press 98, which operates as discussed above to dewater the solids.

Figure 1:
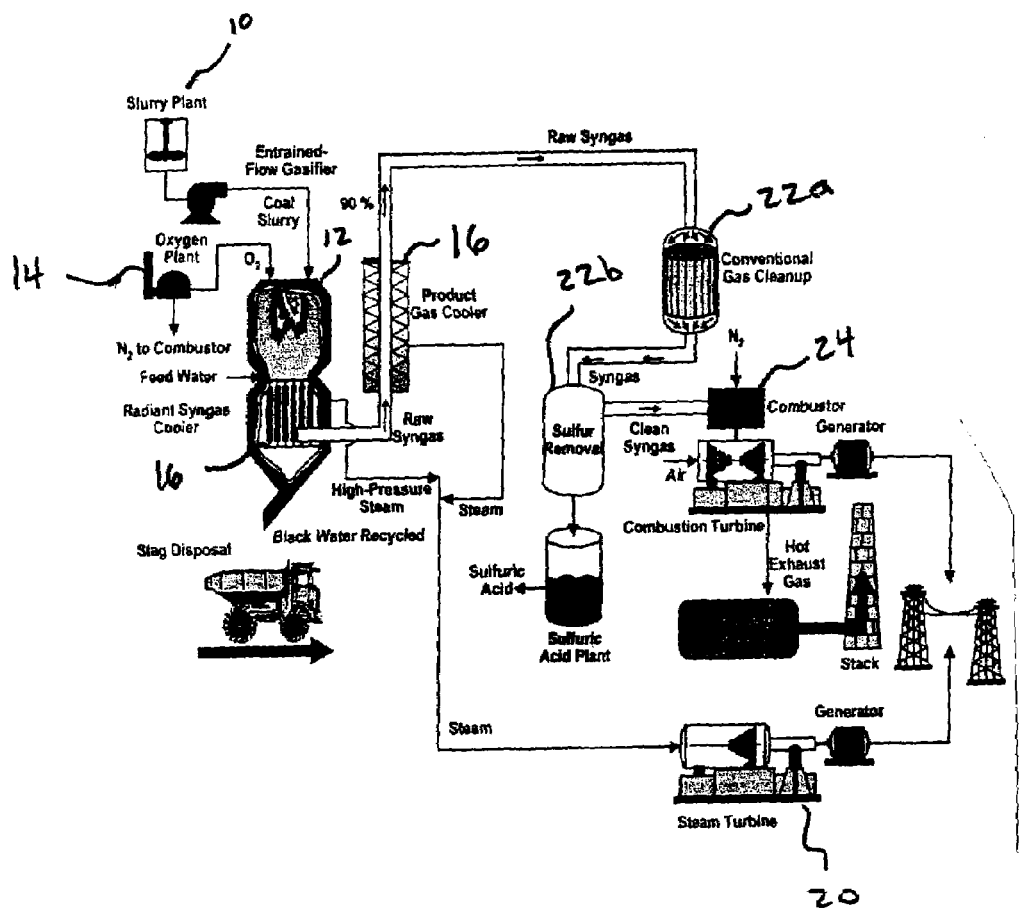
FIG. 1 is a diagram illustrating a coal gasification process, as is known in the art.

During operation of the system 26, the first step in slag beneficiation is typically to produce a pumpable slurry from the slag to be processed. Referring to FIG. 1, since the slag typically is removed from the gasifier 12 as a slurry, it would be technically feasible to pump the slag directly from the gasifier to the processing system 26. While this approach is technically feasible, it would require that the processing system be operated whenever slag is produced. In addition, the slag processing system 26 would need to match the slag generating capacity of the gasifier 12, or provide surge storage.

According to another embodiment of the present invention, the slag preferably is removed from the gasifier 12 as a slurry, dewatered and stored in a stockpile (not shown). Thereafter, stored ash is retrieved and mixed with water or "re-slurried" at a rate to match the operating capacity of the beneficiation system 26. For example, in the embodiments illustrated in FIGS. 2 and 3, the slurry is produced by metering the stored slag with recycled plant process water and water from the beneficiation system 26, 76 into the mix tank 28a, 88a of the blunger 28, 88 where the water and slag are mixed and agitated into a slurry. The consistent operation of this feed preparation stage is important for effective beneficiation of the slag for two primary reasons. First, the feed preparation stage provides a uniform feed or slurry to the sizing screens 30, 90 and breaks apart agglomerated particles. This is particularly important in slag processing because the slag is quite dense and settles readily. Since approximately 30% of the feed slurry solids will be retained on the sizing screens 30, it is imperative that the solids be distributed as uniformly as possible to enable efficient screening.

The slurried feed is pumped using a pump 42, 102 onto the first sizing screen 30a, 90a so that the slurry will flow through the first screen as the first screen removes a first portion of material 50. For embodiments where the sizing screens 30, 90 are in series (not shown), the slurry is pumped onto the second sizing screen 30b, 90b so that the slurry will flow through the second screen as the second screen removes a second portion of material 54 and so forth. According to another embodiment, as illustrated in FIGS. 2 and 3, the sizing screens 30, 90 preferably comprise a screen deck 32, 92 so that the slurry will flow through each screen in succession due to gravity.

As discussed above, the number and sizing of the screens 30, 90 can vary depending upon the specifications of the portions to be beneficiated from the slag. In one embodiment, the screen deck 32, 92 includes a first sizing screen 30a, 90a and a second sizing screen 30b, 90b wherein the first sizing screen is a 0.5 inch (12.7 mm) screen and the second sizing screen is a 20 mesh (841 µm) screen. The first sizing screen 30a, 90a is structured to remove a first portion of material 50 from the slurry, which comprises oversize extraneous material, so that the remaining slag product within the slurry has a uniform size distribution. The oversize material or first portion of material 50 can be discarded or crushed and added back to the plant feed 70, 170, as illustrated in FIGS. 2 and 3. The second sizing screen 30b, 90b preferably is structured to remove the size fractions with lower carbon content.

Spray bars or nozzles 35, 95 can be used to direct a fluid, such as a gas or liquid, onto one or more of the sizing screens 30, 90 to facilitate particles having a size less than the size of the sizing screens washing through the screens. For example, in one embodiment, the spray bars or nozzles 35, 95 direct water onto the first and/or second screens 30a, 90a and 30b, 90b. Similarly, a vibrator 33, 93 can be used with the first and/or second screens 30a, 90a and 30b, 90b to facilitate particles having a size less than the size of the sizing screens washing through the screens.

The first portion of material 50 removed by the first screen 30a, 90a will generally have a size equal to or exceeding the sizing of the first screen and the second portion of material 54 removed by the second screen 30b, 90b will generally have a size less than the sizing of the first screen and equal to or greater than the sizing of the second screen. For example, where the first sizing screen 30a, 90a is a 0.5 inch (12.7 mm) screen and the second sizing screen 30b, 90b is a 20 mesh (841 µm) screen the first portion of material 50 will have a particle size equal to or exceeding about 0.5 inches and the second portion of material 54 will have a particle size less than about 0.5 inches and equal to or exceeding about 841 µm. According to this embodiment, the second portion of material 54 will advantageously contain less than approximately 5% carbon and, more preferably, less than approximately 1% carbon.

According to one embodiment of the present invention, as illustrated in FIG. 2, after the sizing screens 30 the slurry is pumped using pump 52 into a centrifuge 34. The centrifuge 34 serves the dual purpose of dewatering the remaining solids while effectively classifying out a third portion of material 56. As with the sizing screens 30, the sizing of the specifications of the centrifuge 34 can vary depending upon the specifications of the portion to be beneficiated from the slag. In one embodiment, the centrifuge 34 is structured to separate a third portion of material 56 having a particle size less than the size of the smallest sizing screen 30 and greater than or equal to about 45 µm. For example, if the sizing of the smallest sizing screen 30 is about 20 mesh (0.841 mm), the carbon enriched particles that generally range in size from less than about 840 µm to greater than about 75 µm will be contained and dewatered by the centrifuge 34. The third portion of material 56 preferably has a higher carbon content than the second portion of material 54.

As illustrated in FIG. 2, the slurry rejected by the centrifuge 34 can be thickened in a static thickener 36 using anionic flocculants and pH modifiers to remove a fourth portion of material 58 from the slurry. The flocculant provides an adequate settling rate of the flocculated solids, such as about 6 inches to 12 inches per minute. The pH modifiers maintain acceptable water clarity. The fourth portion of material 58 is then pumped from the thickener 36 using pump 66 and dewatered on a belt filter press 38 to produce a "fines" product. The fourth portion of material 58 will generally have a particle size less than the smallest particle size to be removed by the centrifuge 34. In one embodiment, the fourth portion of material 58 will include particles with a size less than about 45 µm. The fourth portion of material 58 or fines product can be used as a fuel product, for example, fed back into the gasifier 12, or used as an adsorbent carbon.

According to another embodiment of the present invention, as illustrated in FIG. 3, after the sizing screens 90 the slurry is pumped using pump 112 into a hydrocyclone 91. The hydrocyclone 91 serves the purpose of removing or classifying out a third portion of material 156. As with the sizing screens 90, the sizing of the hydrocyclone 91 can vary depending upon the specifications of the portion to be beneficiated from the slag. In one embodiment, the hydrocyclone 91 is structured to remove a third portion of material 156 having a particle size less than the size of the smallest sizing screen 90 and greater than about 75 µm. Accordingly, if the sizing of the smallest sizing screen 90 is about 20 mesh (0.841 mm), the third portion of material 156 will have a particle size of less than about 20 mesh or about 840 µm and greater than about 75 µm. Advantageously, because the carbon enriched particles from the slag by-product generally range in size from less than about 840 µm to greater than about 75 µm, these particles are concentrated within the third portion of the material 156 according to the embodiment illustrated in FIG. 3. The third portion of material 156 preferably has a higher carbon content than the second portion of material 54. The third portion of material 156 can be pumped to the centrifuge 94 for dewatering using pump 132 or via gravity feed. The third portion of material 156 can be used as a fuel product, for example, fed back into the gasifier 12, or as an adsorbent carbon.

As illustrated in FIG. 3, the overflow from the hydrocyclone 91 can be pumped to the thickener 96 using pump 122. Similarly, the slurry rejected by the centrifuge 94 can be pumped to the thickener 96 using pump 142. As discussed above, the thickener 96 can include anionic flocculants to settle a fourth portion of material 158 from the slurry and pH modifiers to clarify the water. The flocculants provide an adequate settling rate of the flocculated solids, such as about 6 inches to 12 inches per minute. The pH modifiers maintain acceptable water clarity. The fourth portion of material 158 is then pumped from the thickener 96 using pump 144 and dewatered on a belt filter press 98 to produce a "fines" product. In one embodiment, the fourth portion of material 158 will include particles with a particle size less than about 75 µm. The fourth portion of material 158 or fines product can be used as a fuel product, for example, fed back into the gasifier 12, or used as an adsorbent carbon.

The principal difference between the embodiments illustrated in FIGS. 2 and 3 involves the carbon content of the third portion of material 56, 156. More specifically, the third portion of material 56, according to the embodiment of the invention illustrated in FIG. 2, will have a lower carbon content than the third portion of material 156, according to the embodiment of the invention illustrated in FIG. 3. Accordingly, for applications where it is more important to have a higher carbon content or Btu value for the third portion of material, the embodiment illustrated in FIG. 3 would be more preferable. Alternatively, for applications where it is more important to utilize greater quantities of the slag by-product, the embodiment illustrated in FIG. 2 would be more preferable.

As illustrated in FIGS. 2 and 3, the water from the thickener 36, 96 and belt filter press 38, 98 can be pumped using pumps 80, 180 and 90, 190, respectively, back to the blunger 38, 88 for mixing with the slag to form a slurry, used in connection with sprayers 35, 95, used in connection with sprayers for the belt press (not shown), and/or used for the blowdown return.

The size analysis of a composite feed sample from the plant feed 70, 170 according to one embodiment of the present invention are illustrated in FIG. 4. FIG. 5 shows a condensed size distribution, according to one embodiment of the present invention, once oversize material (i.e., the first portion of material 50) is removed and selected size fractions (i.e., the second portion of material 54, the third portion of material 156 and the fourth portion of material 158) are combined. These results show that the three size fractions each contain approximately ⅓ of the feed solids. The −4+20 mesh fraction (the second portion of material 54) contains only 1.8% carbon loss on ignition ("LOI"), while the −20+80 mesh fraction (the third portion of material 156) contains 63% carbon LOI. The differences in the grade of these two size fractions illustrates the importance of effective classification since carbon is undesirable in the second portion of material 54 and slag is undesirable in the third portion of material 156. Efficient classification ensures that the grade specifications for both products are maintained. For purposes of example only and not limitation, the size analyses of a second portion of material 54, a third portion of material 56, 156, and a fourth portion of material 58, 156, according to other embodiments of the invention, are illustrated in FIGS. 6, 7 and 8, respectively.

Figure 9:
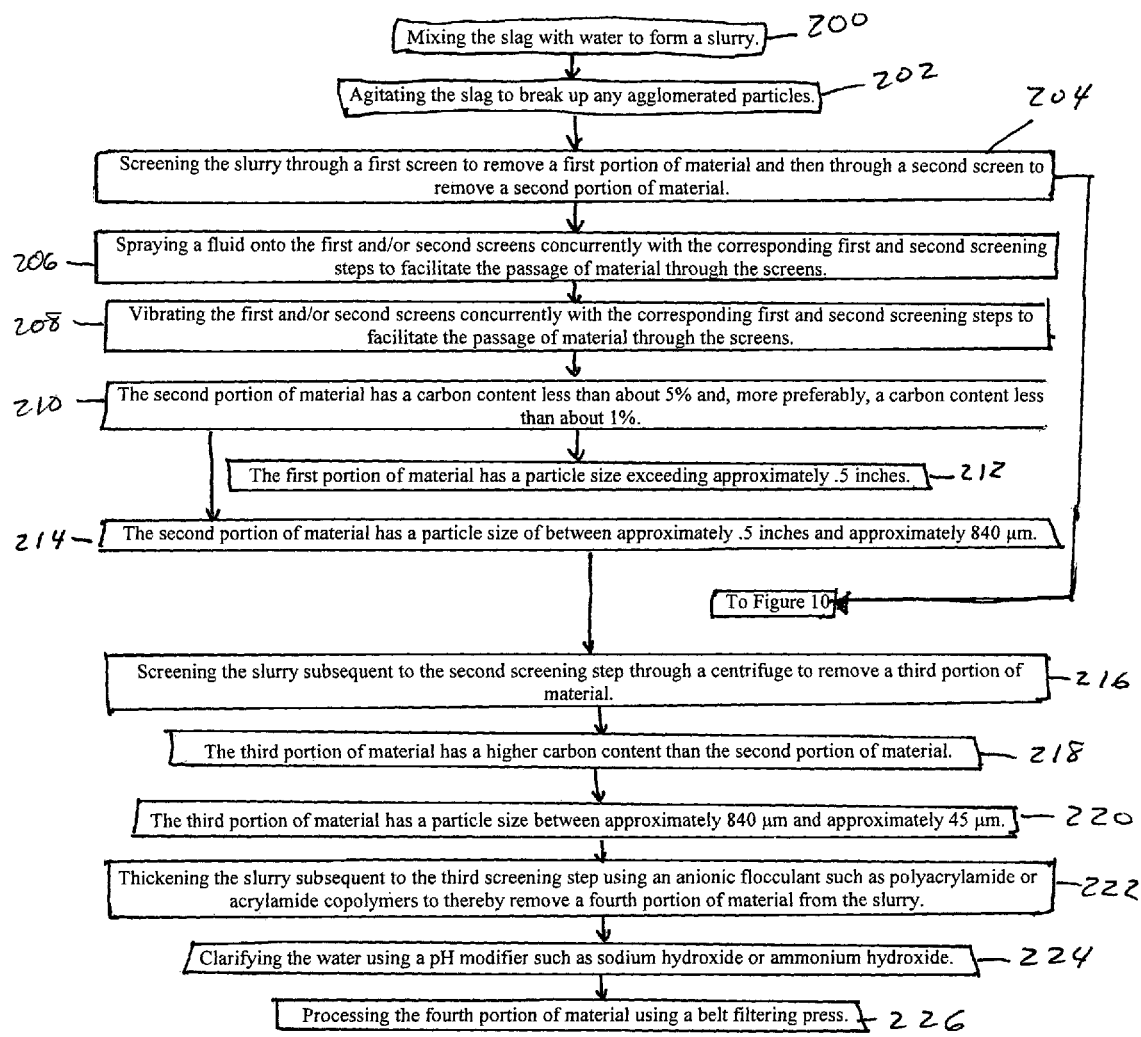
FIG. 9 is a block diagram illustrating a method for beneficiating slag by-product, according to one embodiment of the present invention.

According to one embodiment of the present invention, as illustrated in FIG. 9, the method includes mixing the slag with water to form a slurry. See Box 200. The mixing step can include agitating the slag to break up any agglomerated particles. See Box 202. The slurry is screened through a first screen to remove a first portion of material and then screened through a second screen to remove a second portion of material. See Box 204. A fluid can be sprayed onto one or both of the first and second screens concurrently with the corresponding first and second screening steps to facilitate the passage of material through the screens. See Box 206. The first and/or second screens can also be vibrated concurrently with the corresponding first and second screening steps to facilitate the passage of material through the screens. See Box 208. In one embodiment, the second portion of material has a carbon content less than about 5% and, more preferably, a carbon content less than about 1%. See Box 210. Although the size of the particles in the first and second portions can vary, in one embodiment the first portion of material has a particle size exceeding approximately 0.5 inches. See Box 212. In another embodiment, the second portion of material has a particle size of between approximately 0.5 inches and approximately 840 μm. See Box 214.

The method further includes screening the slurry subsequent to the second screening step through a centrifuge to remove a third portion of material. See Box 216. The third portion of material preferably has a higher carbon content than the second portion of material. See Box 218. The size of the particles in the third portion can vary. In one embodiment, the third portion of material has a particle size between approximately 840 μm and approximately 45 μm. See Box 220. The third portion of material can be used as a fuel product or adsorbent carbon. In still another embodiment, the slurry is thickened subsequent to the third screening step using an anionic flocculant such as polyacrylamide or acrylamide copolymers to thereby remove a fourth portion of material from the slurry. See Box 222. If desired, a pH modifier such as sodium hydroxide or ammonium hydroxide can be used to clarify the water. See Box 224. The fourth portion of material can thereafter be processed using a belt filtering press. See Box 226. In one embodiment, the fourth portion of material has a particle size of less than approximately 45 μm. The processed fourth portion of material can be used as a fuel product.

Figure 10:
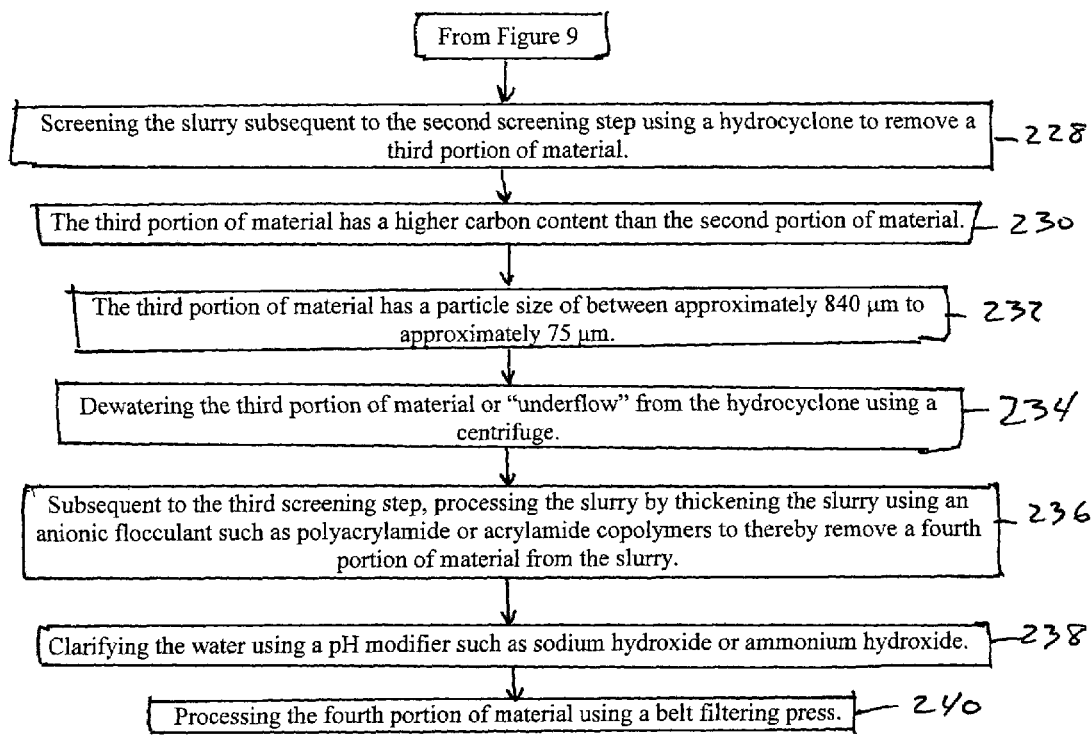
FIG. 10 is a block diagram illustrating a method for beneficiating slag by-product, according to another embodiment of the present invention.

According to yet another embodiment of the present invention, as illustrated in FIG. 10, the method includes screening the slurry subsequent to the second screening step using a hydrocyclone to remove a third portion of material. See Box 228. The third portion of material has a higher carbon content than the second portion of material. See Box 230. The size of the particles in the third portion can vary. In one embodiment, the third portion of material has a particle size of between approximately 840 μm to approximately 75 μm. See Box 232. The third portion of material or "underflow" from the hydrocyclone preferably is dewatered using a centrifuge. See Box 234. The third portion of material can be used as an adsorbent carbon or a fuel product. Subsequent to the third screening step, the slurry can be further processed by thickening the slurry using an anionic flocculant such as polyacrylamide or acrylamide copolymers to thereby remove a fourth portion of material from the slurry. See Box 236. If desired, a pH modifier such as sodium hydroxide or ammonium hydroxide can be used to clarify the water. See Box 238. Thereafter, the fourth portion of material can be processed using a belt filtering press. See Box 240. In one embodiment, the fourth portion of material has a particle size of less than approximately 75 μm. The fourth portion of material can be used as a fuel product.

Accordingly, there has been provided methods and apparatus to beneficiate the slag by-product from gasification economically. The methods and apparatus enable not only the separation of the slag by-products into useful components, but also the separation of the by-products into useful components with acceptable quality and sizing for specific end use markets. The coarse slag by-product, or first and second portions of the material, can be used for many applications, including abrasive media (i.e., sand blasting grit), polishing media, roofing granules, cement kiln feed, athletic track surfaces, landscaping, and road surface coatings. In addition, the coarse slag by-product can also be milled and used as a pozzolanic cement additive to improve the properties of concrete. The finer slag by-product, or third and fourth portions of the material, can be utilized as a supplemental pulverized coal combustion fuel and has shown excellent potential as both an adsorbent and as a precursor for activated carbon.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for beneficiating slag from coal gasification, comprising:
    mixing the slag from coal gasification with water to form a slurry;
    screening the slurry through a substantially planar first screen to remove a first portion of material, wherein the first portion of material has a particle size exceeding approximately 0.5 inches;
    screening the slurry subsequent to said first screening step through a substantially planar second screen to remove a second portion of material, wherein the second portion of material has a particle size of between approximately 0.5 inches and approximately 840 µm; and
    wherein the second portion of material has a carbon content less than about 5%.

2. A method according to claim 1 wherein the second portion of material has a carbon content less than about 1%.

3. A method according to claim 1 further comprising dewatering a slurry prior to said mixing step.

4. A method according to claim 1 wherein said mixing step comprises agitating the slurry.

5. A method according to claim 1 further comprising spraying a fluid onto at least one of the first and second screens concurrently with said corresponding first and second screening steps.

6. A method according to claim 1 further comprising vibrating at least one of the first and second screens concurrently with said corresponding first and second screening steps.

7. A method according to claim 1 further comprising screening the slurry subsequent to said second screening step through a centrifuge to remove a third portion of material.

8. A method according to claim 7 wherein the third portion of material has a particle size of between approximately 840 µm and approximately 45 µm.

9. A method according to claim 7 further comprising using the third portion of material as at least one of a carbon-based combustible fuel and an adsorbent carbon.

10. A method according to claim 7 further comprising thickening the slurry subsequent to said third screening step using an anionic flocculant selected from the group consisting of polyacrylamide and acrylamide copolymers to thereby remove a fourth portion of material from the slurry.

11. A method according to claim 10 further comprising using a pH modifier selected from the group consisting of sodium hydroxide and ammonium hydroxide to clarify the water.

12. A method according to claim 10 wherein the fourth portion of material has a particle size of less than approximately 45 µm.

13. A method according to claim 10 further comprising processing the fourth portion of material using a belt filtering press.

14. A method according to claim 13 further comprising using the processed fourth portion of material as a carbon-based combustible fuel.

15. A method according to claim 1 further comprising screening the slurry subsequent to said second screening step using a hydrocyclone to remove a third portion of material from the slurry.

16. A method according to claim 15 wherein the third portion of material has a particle size of between approximately 840 vm to approximately 75 vm.

17. A method according to claim 15 further comprising dewatering the third portion of material subsequent to said third screening step using a centrifuge.

18. A method according to claim 15 further comprising using the third portion of material as at least one of an absorbent carbon and fuel product.

19. A method according to claim 15 further comprising thickening the slurry subsequent to said third screening step using an anionic flocculant selected from the group consisting of polyacrylamide and acrylamide copolymers to thereby remove a fourth portion of material from the slurry.

20. A method according to claim 19 wherein the fourth portion of material has a particle size of less than approximately 75 vm.

21. A method according to claim 19 further comprising using a pH modifier selected from the group consisting of sodium hydroxide and ammonium hydroxide to clarify the water.

22. A method according to claim 19 further comprising processing the fourth portion of material using a belt filtering press.

23. A method according to claim 22 further comprising using the processed fourth portion of material as a fuel product.

24. A method for beneficiating slag from coal gasification, comprising:
    mixing the slag from coal gasification with water to form a slurry;
    screening the slurry through a substantially planar first screen to remove a first portion of material, wherein the first portion of material has a particle size exceeding approximately 0.5 inches;
    screening the slurry subsequent to said first screening step through a substantially planar second screen to remove a second portion of material, wherein the second portion of material has a particle size of between approximately 0.5 inches and approximately 840 µm;
    screening the slurry subsequent to said second screening step through a centrifuge to remove a third portion of material, wherein the third portion of material has a particle size of between approximately 840 µm and approximately 45 µm; and
    wherein the second portion of material has a lower carbon content than the third portion of material.

25. A method according to claim 24 wherein the second portion of material has a carbon content less than about 5%.

26. A method according to claim 24 further comprising dewatering a slurry prior to said mixing step.

27. A method according to claim 24 wherein said mixing step comprises agitating the slurry.

28. A method according to claim 24 further comprising spraying a fluid onto at least one of the first and second screens concurrently with said corresponding first and second screening steps.

29. A method according to claim 24 further comprising vibrating at least one of the first and second screens concurrently with said corresponding first and second screening steps.

30. A method according to claim 24 further comprising using the third portion of material as at least one of a carbon-based combustible fuel and an adsorbent carbon.

31. A method according to claim 24 further comprising thickening the slurry subsequent to said third screening step using an anionic flocculant selected from the group consisting of polyacrylamide and acrylamide copolymers to thereby remove a fourth portion of material from the slurry.

32. A method according to claim 31 further comprising using a pH modifier selected from the group consisting of sodium hydroxide and sodium hydroxide to clarify the water.

33. A method according to claim 31 wherein the fourth portion of material has a particle size less than approximately 45 μm.

34. A method according to claim 31 further comprising processing the fourth portion of material using a belt filtering press.

35. A method according to claim 34 further comprising using the processed fourth portion of material as at least one of a carbon-based combustible fuel and a adsorbent carbon.

36. A method for beneficiating slag, comprising:
mixing the slag with water to form a slurry;
screening the slurry through a first screen to remove a first portion of material;
screening the slurry subsequent to said first screening step through a second screen to remove a second portion of material;
screening the slurry subsequent to said second screening step using a hydrocyclone to remove a third portion of material from the slurry; and
wherein the second portion of material has a lower carbon content than the third portion of material.

37. A method according to claim 36, wherein the second portion of material has a carbon content less than about 5%.

38. A method according to claim 36 further comprising dewatering a slurry prior to said mixing step.

39. A method according to claim 36 wherein said mixing step comprises agitating the slurry.

40. A method according to claim 36 further comprising spraying a fluid onto at least one of the first and second screens concurrently with said corresponding first and second screening steps.

41. A method according to claim 36 further comprising vibrating at least one of the first and second screens concurrently with said corresponding first and second screening steps.

42. A method according to claim 36 further comprising dewatering the third portion of material subsequent to said third screening step using a centrifuge.

43. A method according to claim 36 further comprising using the third portion of material as at least one of an adsorbent carbon and a fuel product.

44. A method according to claim 36 further comprising thickening the slurry subsequent to said fourth screening step using an anionic flocculant selected from the group consisting of polyacrylamide and acrylamide copolymers to thereby remove a fourth portion of material from the slurry.

45. A method according to claim 44 wherein the fourth portion of material has a particle size of less than approximately 75 vm.

46. A method according to claim 44 further comprising using a pH modifier selected from the group consisting of sodium hydroxide and ammonium hydroxide to clarify the water.

47. A method according to claim 44 further comprising processing the fourth portion of material using a belt filtering press.

48. A method according to claim 47 further comprising using the processed fourth portion of material as at least one of a fuel product or adsorbent carbon.

49. A system for beneficiating a slag slurry comprising slag from coal gasification into usable portions, comprising:
a substantially planar first screen for removing a first portion of material from the slurry, wherein the slurry comprises slag from coal gasification and wherein the first portion of material has a particle size exceeding approximately 0.5 inches;
a substantially planar second screen for removing a second portion of material from the slurry, wherein the second portion of material has a particle size of between approximately 0.5 inches and approximately 840 μm; and
wherein the second portion of material has a carbon content of less than about 5%.

50. A system according to claim 49 wherein the second portion of material has a carbon content less than about 1%.

51. A system according to claim 49 further comprising a blunger for agitating the slurry.

52. A system according to claim 49 further comprising at least one sprayer for spraying fluid onto at least one of the first and second screens.

53. A system according to claim 49 further comprising at least one vibrator for vibrating at least one of said first and second screens.

54. A system according to claim 49 further comprising a centrifuge for removing a third portion of material from the slurry.

55. A system according to claim 54 wherein the third portion of material has a particle size of between approximately 840 μm to approximately 45 μm.

56. A system according to claim 49 further comprising a thickener for removing a fourth portion of material from the slurry.

57. A system according to claim 56 further comprising a belt filtering press for dewatering the fourth portion of material.

58. A system according to claim 49 further comprising a hydrocyclone for removing a third portion of material from the slurry.

59. A system according to claim 58 wherein the third portion of material has a particle size of between approximately 840 vm to approximately 75 vm.

60. A system according to claim 58 further comprising a centrifuge for dewatering the third portion of material.

61. A system according to claim 58 further comprising a thickener for removing a fourth portion of material from the slurry.

62. A system according to claim 61 further comprising a belt filtering press for dewatering the fourth portion of material.

63. A system for beneficiating a slag slurry comprising slag from coal gasification into usable portions, comprising:
a substantially planar first screen for removing a first portion of material from the slurry, wherein the slurry comprises slag from coal gasification and wherein the first portion of material has a particle size exceeding approximately 0.5 inches;

a substantially planar second screen for removing a second portion of material from the slurry, wherein the second portion of material has a particle size of between approximately 0.5 inches and approximately 840 μm;

a centrifuge for removing a third portion of material from the slurry; and wherein the second portion of material has a lower carbon content than the third portion of material.

64. A system according to claim 63 wherein the second portion of material has a carbon content less than about 5%.

65. A system according to claim 63 further comprising a blunger for agitating the slurry.

66. A system according to claim 63 further comprising at least one sprayer for spraying fluid onto at least one of the first and second screens.

67. A system according to claim 63 further comprising at least one vibrator for vibrating at least one of said first and second screens.

68. A system according to claim 63 wherein the third portion of material has a particle size of between approximately 840 μm and approximately 45 μm.

69. A system according to claim 63 further comprising a thickener for removing a fourth portion of material from the slurry.

70. A system according to claim 69 further comprising a belt filtering press for dewatering the fourth portion of material.

71. A system for beneficiating a slag slurry into usable portions, comprising:

a first screen for removing a first portion of material from the slurry;

a second screen for removing a second portion of material from the slurry;

a hydrocyclone for removing a third portion of material from the slurry; and wherein the second portion of material has a lower carbon content than the third portion of material.

72. A system according to claim 71 wherein the second portion of material has a carbon content less than about 5%.

73. A system according to claim 71 further comprising a blunger for agitating the slurry.

74. A system according to claim 71 further comprising at least one sprayer fluid onto at least one of the first and second screens.

75. A system according to claim 71 further comprising at least one vibrator for vibrating at least one of said first and second screens.

76. A system according to claim 71 wherein the third portion of material has a particle size between approximately 840 vm to approximately 75 vm.

77. A system according to claim 71 further comprising a centrifuge for dewatering the third portion of material.

78. A system according to claim 71 further comprising a thickness for removing a fourth portion of material from the slurry.

79. A system according to claim 78 further comprising a belt filtering press for dewatering the fourth portion of material.

* * * * *